United States Patent [19]
Robinson et al.

[11] Patent Number: 5,529,404
[45] Date of Patent: Jun. 25, 1996

[54] ADHESIVELESS ASSEMBLY WITH LASER WELDING

[75] Inventors: Peter G. Robinson, Capitola; Robert A. Nottingham, Santa Cruz; Norbert S. Parsoneault, Watsonville; Donald J. MacLeod, Santa Cruz, all of Calif.

[73] Assignee: Seagate Technology, Inc., Scotts Valley, Calif.

[21] Appl. No.: 252,321

[22] Filed: Jun. 1, 1994

[51] Int. Cl.⁶ .................................................. F16C 43/04
[52] U.S. Cl. ...................... 384/617; 384/121; 29/898.062
[58] Field of Search ................................ 384/617, 107, 384/112, 121, 625, 123; 29/898.061, 898.062

[56] References Cited

U.S. PATENT DOCUMENTS 5,290,070  3/1994  Deits et al. .......................... 384/625
5,328,272  7/1994  Ainslie et al. ....................... 384/112
5,430,590  7/1995  Ainslie et al. ....................... 384/107

*Primary Examiner*—Lenard A. Footland
*Attorney, Agent, or Firm*—Flehr, Hohbach, Test, Albritton & Herbert

[57] ABSTRACT

A spindle motor for use in a disc drive comprises a shaft, bearings located on either end of said shaft, said bearings having inner and outer races, a hub supported on the outer race of said bearings, for rotation therewith, said inner race of said bearings being welded to said shaft, said outer race of said bearings being laser welded to said hub whereby the components of said motor are permanently fixed relative to one another.

14 Claims, 4 Drawing Sheets

5,529,404

ADHESIVELESS ASSEMBLY WITH LASER WELDING

CROSS REFERENCE TO A RELATED APPLICATION

The subject application is useful in most disk drives, a typical example is shown in U.S. patent application Ser. No. 07/893,641, abandoned, filed Jun. 5, 1992, assigned to the assignee of the present application and incorporated herein by reference.

The motor assembly techniques utilized here are especially useful in a motor and seal of the type described in U.S. patent application Ser. No. 08/236,521, filed May 2, 1994, entitled ADHESIVELESS SEAL ASSEMBLY, incorporated herein by reference.

FIELD OF THE INVENTION

This invention relates to magnetic disk drives and particularly to an improved method of assembly of a spindle motor or pivot bearing design for use in a disk drive, wherein improved laser welding techniques are utilized to reduce or minimize contaminants generated by the motor which might otherwise enter the sealed head disk assembly of the disk drive.

BACKGROUND OF THE INVENTION

Disk drive units in general are known in the art for use in modern micro computers such as personal and desktop computers. In the most common form, such disk drive units comprise a so called Winchester disk drive having one or more rotatable memory storage disks mounted within a substantially sealed disk drive housing along with one or more related electromagnetic heads for reading and writing data on appropriately prepared surfaces of the disks. A disk drive of this type is sometimes referred to as a hard or a fixed disk drive and is normally available as a compact, complete package with a sealed housing on a rigid chassis or frame together with a circuit board carrying the necessary drive electronics.

Within the sealed disk drive, a rotating constant speed spindle motor is provided for mounting and rotating the disks. Because of the extremely fine tolerances in the internal components of the disk drive, especially the head and disk surfaces, the head-disk assembly is sealed against the outside air to prevent the entry of contaminants. However, it is also necessary to deal with and suppress the sources of contaminants within the disk drive. Currently, a primary source of the problem is that in order to minimize the size of the disk drive, modern spindle motors are designed with many components inside the hub which supports the disks. Typically, adhesives are widely used in spindle motors as a means to retain individual components within the assembly.

Adhesives are typically used in spindle motor to retain components such as bearings, shafts and bores precisely in their relative positions, and to maintain the bearing system in a preloaded condition. Because of the manufacturing sequence for spindle motors, and the difficult environmental conditions in which disk drives are used, the requirements for the adhesive used in the spindle motor are demanding and pose a difficult choice for the user. The adhesive requirements are that it maintain it structural integrity in the motor over temperature cycles which can range from −40° to 70° centigrade. The adhesive must further maintain its structural integrity under significant shocks. In order to avoid contaminating or providing any contaminants to the interior of the sealed disk drive, the adhesive must have a very low out-gasing characteristic.

Furthermore, in order to be consistent with the manufacturing sequence and not unduly delay the assembly of the motors, the adhesive must be capable of both a fast cure and a complete cure so that the spindle motor remains completely clean of any residue. The adhesive must be easy to dispense, and preferably be a single component adhesive. Few practical adhesives are available which satisfy all these requirements. The adhesives that are available are expensive, and the cost of assembly of spindle motors in both process time and tools is high. Therefore, it is highly desirable to replace the use of adhesives with an alternative approach to the final structural assembly of the spindle motor.

SUMMARY OF THE INVENTION

It is the objective of this invention to provide a means and method for assembling the components of a spindle motor for a disk drive, and meet the technical requirements of the motor for such a use without the use of adhesives in assembling the motor.

It is a further objective of the present invention to provide a spindle motor which has improved structural reliability over the temperature cycles which occur in a disk drive.

A further and related object of the present invention is to provide structural integrity in response to shock loads which occur with disk drives and the computers, especially portable computers, in which they are used.

It is a further objective of the present invention to eliminate or substantially eliminate the use of adhesives in the assembly of spindle motors, thereby eliminating the adhesive out-gasing problem in the disk drive.

A further objective of the present invention is to provide an approach to assembly of a disk drive spindle motor which allows for fast reliable assembly of the spindle motor, and which eliminates the need for cure time for the adhesive.

In another objective of the present invention is to provide a low cost assembly method for a disk drive spindle motor in which no adhesives are required to complete the assembly.

Yet another of the objectives of the present invention is to provide an accurate and reliable method of setting the bearing preload, without the use of adhesives which may allow for a relaxation of the initially set preload during the course of curing of the adhesive.

These and other objectives of the present invention are achieved by assembling the spindle motor wherein the primary elements of the spindle motor are welded in place rather than using adhesives. The method includes welding the bearing system in place, specifically by laser spot welding the inner races to the shaft in a preloaded state forming a shaft subassembly. Typically, the assembly of the bearings is continued by welding the outer races to a steel sleeve forming a sleeve subassembly. The two subassemblies are joined together by further welds; with the addition of a disc-supporting hub, the motor is formed. The method may be extended to form a pivot bearing which may be inserted into an E block which supports the actuator arms. The E block itself is initially heat shrunk onto a steel sleeve to eliminate adhesives.

Thus, the laser welding method of the present invention can effectively be used to form a pivot assembly which is useful in disk drives.

Other features and advantages of the present invention will become apparent with person of skill in the art who studies the following detailed description of the invention given with reference to the following drawings:

DETAILED DESCRIPTION OF THE DRAWINGS

DETAILED DESCRIPTION OF THE PREFERRED EMBODIMENT

Figure 1:
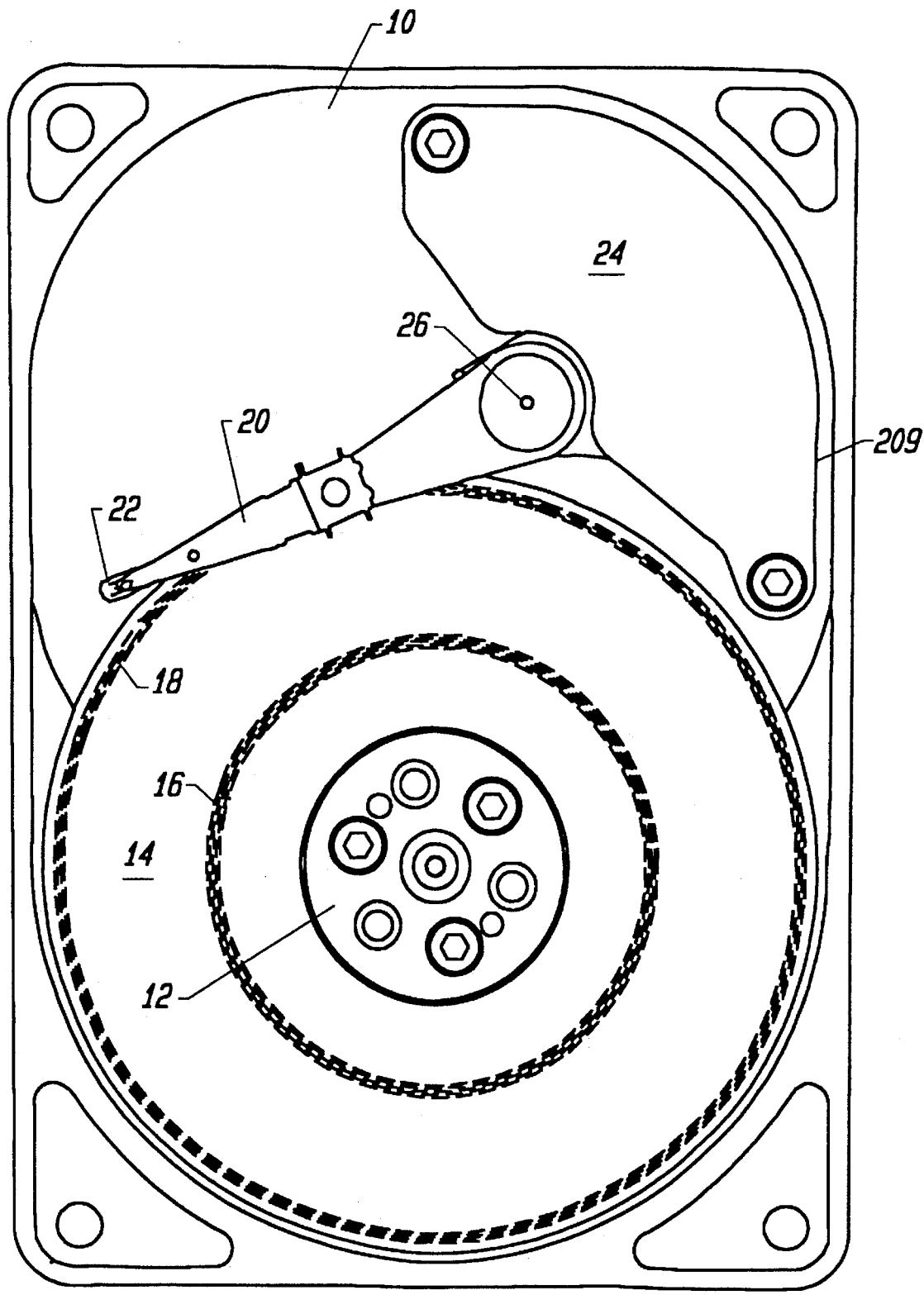
FIG. 1 is a top plan view of a disk drive of a type in which bearing assemblies for spindle motors or actuator pivots may typically be used.
Figure 2:
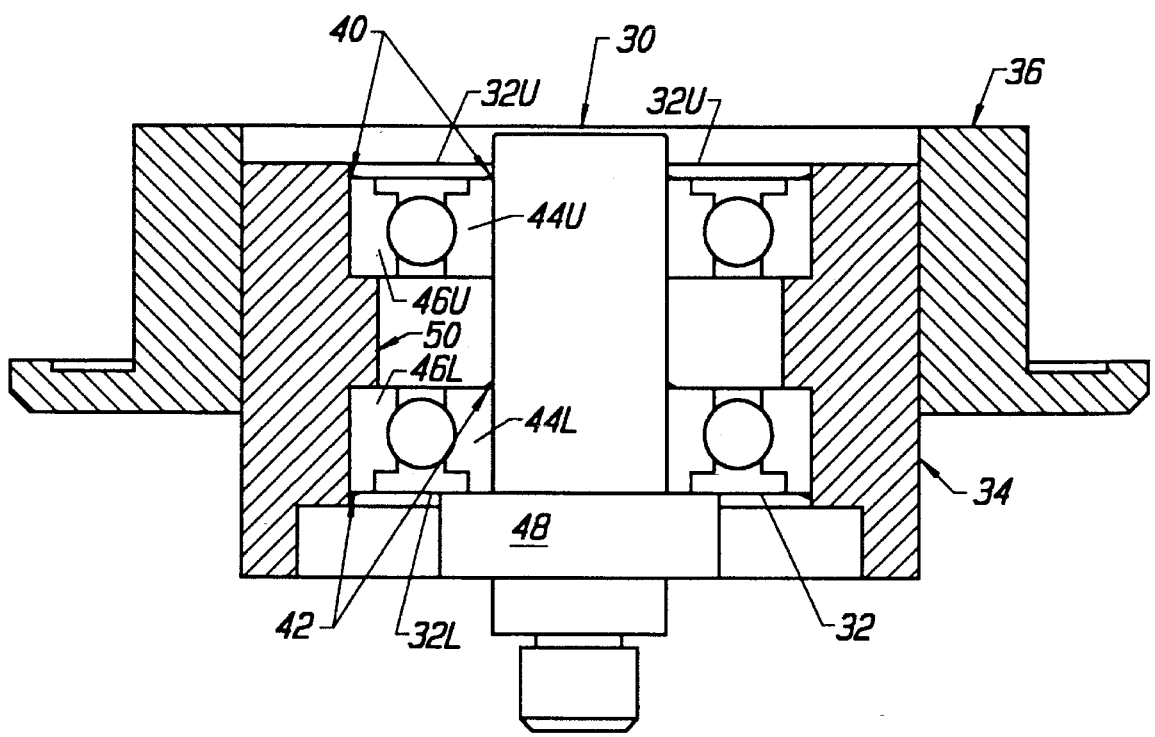
FIG. 2 is a elevation sectional view of a motor assembly incorporating the improvements of the present invention.
Figure 3A:
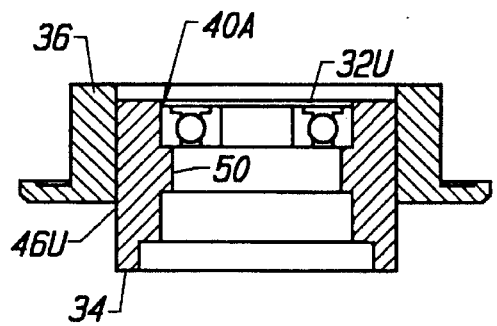
FIGS. 3A, 3B, 3C, 3D and 3E are a sequence of figures showing the assembly motor flow for forming a spindle motor utilizing the techniques of the present invention.
Figure 3B:
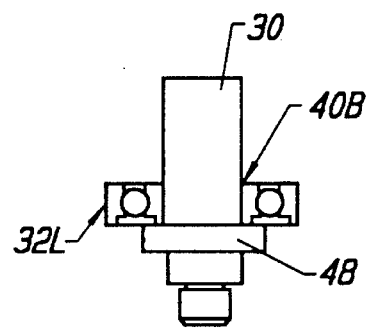
Figure 3E:
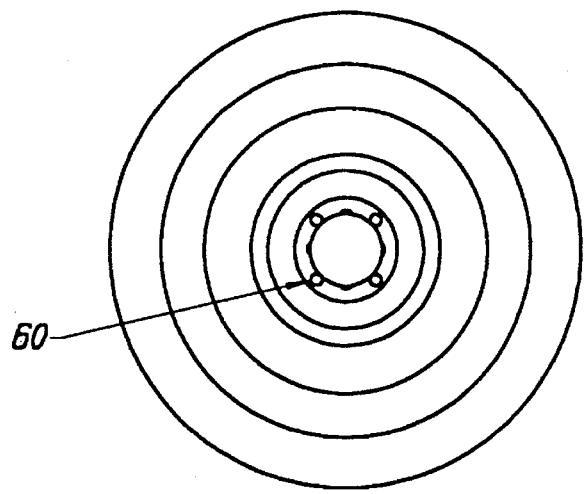
Figure 3C:
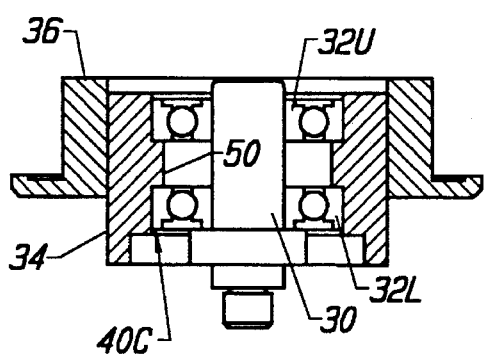
Figure 3D:
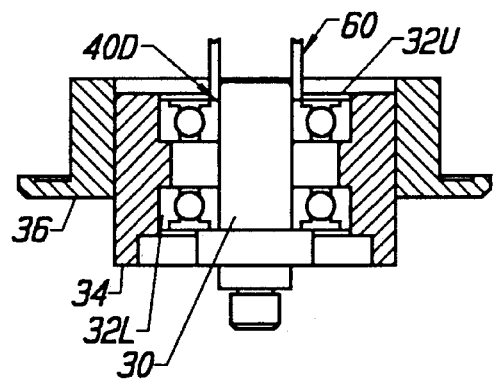
Figure 4:
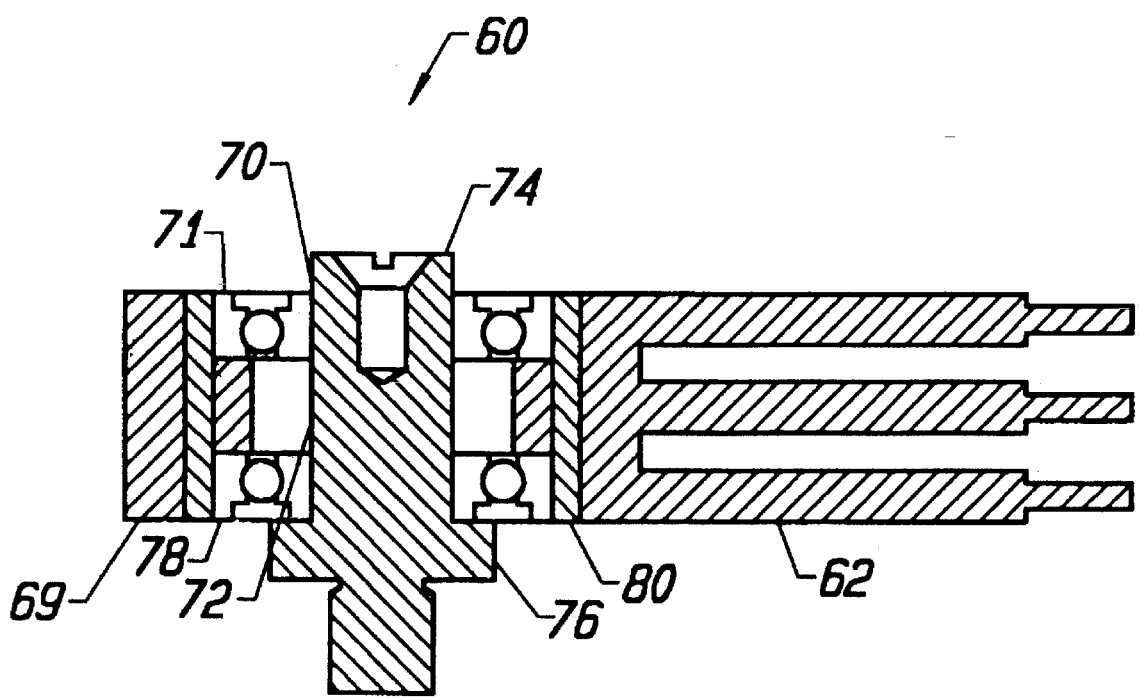
FIG. 4 is a front elevational view of a pivot assembly utilizing the methods of assembly of the present invention.

The details of the welding scheme for forming the finished mode of motor product or pivot assembly of the present invention are most readily apparent from the sectional views of FIG. 2 and 4. The sequence of steps to be followed to weld the elements of the motor or pivot assembly in place are readily apparent from FIG. 3. FIG. 1 will first be described as it shows the general environment in which this invention is especially useful.

Thus, turning first to FIG. 1, the figure comprises a top plan view of a disk drive which may utilize either the spindle motor or pivot assembly or both of the present invention. As such, the disk drive includes a housing 10 including a spindle motor generally indicated at 12 for supporting one or more disks 14 for rotation by the spindle motor. A plurality of tracks ranging from the inner radius 16 to the outer radius 18 of each disk stores data on an appropriate prepared surface of the disk 14. An actuator arm 20 supports a transducer 22 which is selectively positioned over any one of the tracks by a voice coil motor shown generally at 24.

Accurate positioning of the transducer over one of the tracks requires, among other things, a reliable pivot assembly 26 which does not wobble or distort or shift the relative position of the arm in any way. Similarly, it would be highly damaging to accurate positioning of the arm over a desired track if the spindle motor did not rotate at a constant speed, or was distorted or allowed wobbling of the disks about the rotating spindle in any way. Finally, as discussed above, it is essential to functioning of modern disk drives that the sealed housing 10 which is shown broken away in this particular view does not include any contaminants such as can be frequently introduced by the out-gasing or other deterioration of an adhesive used to hold the spindle motor or pivot shaft assembly together. Thus the need for the present invention.

An exemplary spindle motor with which the present invention is especially useful appears in the vertical section of FIG. 2. As will immediately be apparent to a person of skill in the art, many of the details including coils, magnet and control wires do not appear in this figure. The reason for these omissions is that the method of assembly of the spindle motor disclosed and claimed herein is not limited to motors of a specific design, whether fixed shaft or rotating shaft or having other unique characteristics.

The basic elements of the motor which appears in FIG. 2 include a shaft 30, bearings 32, a sleeve 34 and hub 36 supported on the sleeve 34 for rotation. The hub will support the disks 14 with rotation of the spindle motor. The laser welds are generally indicated at 40 for the upper bearing 32U and 42 for the lower bearing 32L. The function of the laser welds is both to secure the inner race 44U and 44L of each bearing to the shaft, and to secure the outer race 46U, 46L of each bearing to the sleeve in a properly preloaded condition. The shaft 30 and sleeve 34 in this particular embodiment have flanges 48, 50, respectively that position the bearings axially before welding. These flanges are used to define the desired position for each bearing. The bearings are properly preloaded before being welded in place by the use of a fixture which will be described below. The laser welds then maintain the required bearing preload, while eliminating the potential problem of adhesive relaxation. As will be discussed with respect to the process flow to be described with respect to FIG. 3, fixturing may also be used to position the bearing components axially and to achieve the proper preload of the bearings in those defined positions.

Referring next to FIGS. 3A–3E, it can be seen that the typical spindle motor comprises an assembly of two subassemblies. This sequence is adopted primarily for ease in reaching the locations in which welds must be placed in order to securely locate the separate pieces of the motor assembly. It will be understood of course that the process sequence is not limited to motors of this design although this has been determined to be a highly efficient approach to the assembly flow.

Referring first to FIG. 3A, this figure shows the upper bearing 32U installed in the sleeve 34. The hub may already be in place, or may be put in place afterward. The important feature to note is that the first weld 40A is now put in place, preferably at a chamfer which is a junction between the outer corner at preferably a chamfer in the outer race 46U of the upper bearing, which is the junction between this outer race and the sleeve 34. Because of the presence of the flange 50, this is all that is needed to properly locate this bearing and the assembly is rapid and efficient. Obviously, in the absence of the flange 50, a proper fixture could be used to achieve the same goal. As a second step, illustrated in FIG. 3B, the second subassembly is formed comprising a bearing 32L installed on the shaft 30 and located by virtue of the presence of the flange 48 on the shaft. Again, a weld 40B is used to locate the bearing on the shaft. In this case, the weld 40B is placed in a chamfer of the inner race between the inner race and the surface of the shaft 30.

Moving next to FIG. 3C, the sleeve assembly 50 of FIG. A and the shaft assembly 52 of FIG. B are joined together and welded in place as shown in the FIG. 3C. They are joined and fixed together by a weld 40C which is placed in a chamfer of the outer race 46L of the lower bearing 32L joining the outer edge of the lower bearing to the inner surface of the sleeve 34. Once again, the presence of the shoulder 50 fixes and locates the elements; however, those of skill in the art would recognize that appropriate fixturing could also be utilized. Finally, in FIG. 3D, using an appropriate fixture which comprises a plurality of pins indicated generally at 60, the pins press against the inner face of the upper bearing so that the upper bearing 32U is preloaded; a further weld 40D is used to fix the preload of the upper bearing.

As shown in FIG. 3E, the welds comprise a plurality of spot or bead welds which are regularly spaced along the region to be welded; spot welds take less time than a strip weld and distort the bearings less due to a smaller heat-affected-zone.

Referring next to FIG. 4, the figure illustrates the use of the laser spot welding technique in place of adhesives to form an adhesiveless pivot assembly generally indicated at 60. This adhesiveless pivot assembly is incorporated in the disk drive in the location generally indicated at 26 in FIG. 1 to support the actuator arm or arms for rotation. The actuator arm which is generally referenced at 20 in this vertical sectional view, comprises the E block 62 which may support a plurality of actuator arms for interaction with a plurality of disks which are not shown. Once again, the reliable and permanent positioning of each element of the pivot assembly is very essential for the successful formation of the pivot assembly 60 because of the small tolerance for error which is allowed in small form factor disk drives. In this case, to form the pivot assembly, the inner races of the upper and lower bearings are spot welded at locations 70, 72 to the shaft 74 of the pivot assembly. This shaft 74 in this preferred example includes a flange 76 which is used to locate the lower bearing 68. A spacer 69 provides the desired spacing between the lower space bearing 68 and the upper bearing 71. This welding using the flange 76 and spacer 69 for location of the bearings adjacent the shaft also allows for spot welding of the inner races of the bearings in a properly preloaded state. The outer races are then welded to a steel sleeve 80. The E block 62 has typically been hear shrunk onto the steel sleeve before the bearing assembly step. By following this sequence, only spot welding and heat shrinking techniques are needed to assemble an adhesiveless pivot assembly. It may be desirable or acceptable under some circumstances to only use the spot welding technique to form the pivot bearing cartridge; some methods may require the use of adhesives to join the E block 62 to the sleeve 80 without departing from the spirit and scope of the invention.

Once again, the number of spot welds depends on the required axial bond strength and may comprise four or more spot welds as desired by a particular approach or embodiment.

It is apparent to a person of skill in the art who studies this disclosure that the bearing preload is more reliable than with adhesive joined assembly; therefore, this is the most desired location for using the laser spot welding technique; it may be desired under certain circumstances to utilize adhesive in certain locations while only using the spot welding for setting bearing preload. However, the most desirable embodiment completely eliminates the adhesives to eliminate the out-gasing problem and the other negatives of the use of adhesives. Other alternatives may also be adopted by a person of skill in the art who studies the present invention disclosure whereby the scope of the present invention is to be limited only by the following claims.

What is claimed is:

1. A spindle motor for use in a disc drive comprising a shaft, bearings located on either end of said shaft, said bearings having inner and outer races, a hub supported on the outer race of said bearings, for rotation therewith, said inner race of said bearings being welded to said shaft, said outer race of said bearings being laser welded to said hub whereby the components of said motor are permanently fixed relative to one another.

2. A spindle motor as claimed in claim 1 further comprising a sleeve fixed to the outer race of said bearings, by said laser welds, said hub being supported from the outer surface of said sleeve set forward for rotation with said sleeve and said outer race of said bearings.

3. A spindle motor as claimed in claim 2 including a first laser weld joining said outer race of each of said bearings to said sleeve, and a second laser weld joining said inner race of each of said upper and lower bearings to said shaft.

4. A spindle motor as claimed in claim 3 wherein said laser weld comprises a spot weld located periodically around said outer race and around said shaft of said spindle motor.

5. A spindle motor as claimed in claim 4 wherein said sleeve includes a flange located between said upper and said lower bearings and serving as a locating device for said outer race of each of said upper and lower bearings in said spindle motor.

6. A method of assembling the motor of claim 5 including the steps of forming a first subassembly comprising said sleeve and said upper bearing, the outer edge of said upper bearing being spot welded to an interior bore surface of said sleeve;

forming a second subassembly comprising said shaft and said lower bearing, the inner race of said lower bearing being spot welded to said shaft;

and joining said first and second subassemblies and welding said outer race of said lower bearing to said sleeve, and said inner race of said upper bearing to said shaft.

7. A pivot bearing assembly for use in a disk drive comprising a shaft, upper and lower bearings fixed to said shaft, by laser welding, and a sleeve attached by laser welding to the outer races of said bearings to form a complete pivot bearing cartridge.

8. A pivot bearing as claimed in claim 7 including a spacer located between the outer races of said upper and lower bearings, said spacer defining the spacing and aiding in defining the preload of said upper and lower bearings.

9. A pivot bearing cartridge as claimed in claim 8 wherein said shaft comprises a flange supporting the inner races of said lower bearings, said inner bearings of said lower and upper bearings being laser welded to said shaft to fix the preload of said bearings on said shaft area.

10. A pivot bearing as claimed in claim 9, wherein said laser welds comprise spot welds located regularly spaced around the circumference of said pivot bearing cartridge.

11. A method of assembling the pivot assembly of claim 10 wherein said lower bearings are welded in place to said shaft by spot welding the upper surface of said inner race of said bearing to said shaft, the lower surface of said inner race being pressed against the flange of said shaft.

12. The method of assembly as claimed in claim 11 wherein the inner upper surface of the inner race of said bearing is spot welded to said shaft to establish the preload of said bearings.

13. A method of assembly of pivot bearing cartridge as claimed in claim 12 including the use of a fixture comprising a plurality of pins circumferentially located around said shaft and pressed against the inner race of said bearings to preload said bearings against said shaft.

14. A pivot bearing assembly as claimed in claim 13 further comprising an E block for supporting one or more actuator arms for movement with rotation of the pivot cartridge assembly over the surface of a disk, said E block being heat shrunk onto the outer surface of said sleeve to establish a complete actuator arm pivot assembly without the use of adhesives.

\* \* \* \* \*